United States Patent
Sung et al.

(10) Patent No.: US 11,096,231 B1
(45) Date of Patent: Aug. 17, 2021

(54) USE OF INTERMEDIARY TO CONTROL DEVICE CONNECTIVITY

(71) Applicant: Sprint Spectrum L.P., Overland Park, KS (US)

(72) Inventors: Sanghoon Sung, Ashburn, VA (US); Yun Sung Kim, Ashburn, VA (US); Udit Thakore, Fairfax, VA (US); George W. Harter, III, Centreville, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 153 days.

(21) Appl. No.: 16/523,306

(22) Filed: Jul. 26, 2019

(51) Int. Cl.
| | |
|---|---|
| *H04W 76/16* | (2018.01) |
| *H04W 76/30* | (2018.01) |
| *H04W 76/27* | (2018.01) |
| *H04W 88/16* | (2009.01) |
| *H04W 24/10* | (2009.01) |
| *H04W 92/10* | (2009.01) |

(52) U.S. Cl.
CPC ........... *H04W 76/16* (2018.02); *H04W 24/10* (2013.01); *H04W 76/27* (2018.02); *H04W 76/30* (2018.02); *H04W 88/16* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 2019/0253937 A1* | 8/2019 | Hsieh | H04W 76/27 |
| 2020/0112879 A1* | 4/2020 | Shimoda | H04L 1/16 |
| 2020/0214073 A1* | 7/2020 | Shimoda | H04W 16/32 |

\* cited by examiner

*Primary Examiner* — Alex Skripnikov

(57) ABSTRACT

A method and system to help control connectivity of a UE served with dual connectivity by a master node and a plurality of secondary nodes. An intermediary that is disposed between a core-network gateway system and the secondary nodes tracks data flow between the gateway system and the secondary nodes and provides the master node with a data-flow report, which the master node could use as a basis to trigger release of the UE's RRC connection, and/or to control addition or removal of one or more secondary nodes for the UE's dual-connectivity service.

18 Claims, 6 Drawing Sheets

USE OF INTERMEDIARY TO CONTROL DEVICE CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a reference signal that UEs could measure in order to determine coverage strength, other resources could be reserved to carry downlink control-plane signaling from the access node to UEs, and other resources could be reserved to carry user-plane communications from the access node to UEs. And on the uplink, certain resources could be reserved to carry uplink control-plane signaling from UEs to the access node, and other resources could be reserved to carry user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node, thus putting the UE in an RRC-connected mode. Further, if appropriate, the UE could then engage in attach signaling, via the access node, with a core-network controller to attach and thus register for service, and the core-network controller could coordinate setup for the UE of a user-plane bearer, including an access-bearer portion that extends between the access node and a core-network gateway system that provides connectivity with a transport network and a data-radio bearer (DRB) portion that extends over the air between the access node and the UE.

Once the UE is connected and attached, the access node could then serve the UE with packet-data communications.

For instance, when the core-network gateway receives packet data for transmission to the UE, the data could flow over the UE's access bearer to the access node, and the access node could buffer the data, pending transmission of the data to the UE over the UE's DRB. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data to the access node over the UE's DRB, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry at least some of the data from the UE and could transmit to the UE a scheduling directive indicating those upcoming PRBs, and the UE could accordingly transmit the data to the access node in those PRBs.

Such a system could also implement a process by which, if the packet data has not flowed over the UE's RRC connection for a threshold inactivity period, the access node could release the UE's RRC connection, thus transitioning the UE to an RRC-idle mode. In the RRC-idle mode, the UE may operate in a low-power or sleep state and periodically wake up to check for page messages and other information. If the idle-mode UE has packet-data to transmit, the UE could then newly engage in signaling with the access node to establish an RRC connection through which to transmit the data. And if the network has data to transmit to the idle-mode UE, the access node could page the UE and the UE could then similarly engage in signaling with the access node to establish an RRC connection through which to receive the data.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by one or more 5G access nodes (next generation Node-Bs (gNBs)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just LTE for instance.

In some dual-connectivity arrangements, an access node operating under a first RAT could serve as a master node (MN), responsible for coordinating setup and teardown of dual-connectivity service for a UE, responsible for managing RRC state of the dual-connected UE based on overall data flow between the network and the UE, and functioning as an anchor point for core-network control signaling related to the dual-connected UE. And each of one or more access nodes operating under a second RAT (or one of one or more second RATs) could serve as a secondary node (SN) to provide increased data capacity for the UE. With EN-DC, for example, a 4G eNB could operate as the MN, and one or more 5G gNBs could operate SN(s).

When the UE enters into coverage of such a system, the UE could initially scan for coverage under the first RAT and discover threshold strong coverage of the MN, and the UE could responsively engage in signaling as discussed above to establish an RRC connection between the UE and the MN. Further, the UE could engage in attach signaling with a core-network controller, via the MN, and the core-network controller could coordinate establishment for the UE of a bearer including an access bearer between the MN and a core-network gateway system and a DRB between the MN and the UE.

The MN could then serve the UE in a first-RAT standalone mode (i.e., under just the first RAT) with packet-data communications in the manner described above.

Further, the MN could trigger and/or engage in a process to establish for the UE a secondary connection with each of one or more SNs, so that the MN and SN(s) can then cooperatively provide the UE with dual-connectivity service. For instance, the MN could engage in RRC signaling with the UE to direct the UE to scan for secondary coverage under the second RAT and could receive in response from the UE an RRC message carrying a measurement report indicating that the UE detected threshold strong coverage of one or more SNs. And the MN could then coordinate setup of dual-connectivity service for the UE to be served by the MN and at least one such SN.

While the specifics of setting up dual connectivity may vary from implementation to implementation, in an example, the MN could engage in signaling with each such SN, with the UE, and with the core-network controller, to coordinate setup of the dual-connectivity service. For instance, the MN could engage in signaling with the UE and with each of one or more SNs to arrange for setup of a secondary connection between the UE and the SN. And the MN could engage in signaling to trigger setup of a split-bearer arrangement so that the MN could then serve a portion of the UE's data communications and each such SN could serve another portion of the UE's data communications, each in the manner discussed above for instance. Further, the extent of data that gets conveyed over the UE's connection with the SN(s) versus over the UE's connection with the MN could depend on various factors such as buffer fullness and service-level requirements, among others.

When a UE is so served concurrently by an MN and by one or more SNs, each SN might have its own respective interface with the core-network gateway system through which packet-data to/from the UE could pass. As a result, at least some data headed to the UE could flow from the core-network gateway system to one or more SNs and from each such SN over the air to the UE without the MN being aware of that data flow. Further, when the UE has data to transmit, at least some of that data could flow over the air from the UE to one or more such SNs and from each such SN to the core-network gateway system without the MN being aware of that data flow.

As noted above, however, the MN may be the entity responsible for managing the overall RRC state of the dual-connected UE, based on a consideration of data flow between the network and the UE. Yet to do so, the MN may need to consider not only the state of data flow over the MN's connection with the UE but also the state of data flow over each of one or more SNs' connections with the UE. To facilitate this, the MN may need to receive and track reports from each such SN, indicating when there is and has been at least a threshold period of inactivity on the SN's connection with the UE.

When the MN determines that there is and has been at least a threshold period of inactivity on the MN's own connection with the UE and on each of the one or more SNs' connections with the UE, the MN may then transition the UE from RRC-connected mode to RRC-idle mode. For instance, the MN could then engage in signaling to transition the UE from dual connectivity back to standalone connectivity with the MN, and the MN could then engage in signaling to release the UE's RRC connection, putting the UE in RRC-idle mode. In the idle mode, if the UE then has packet-data to transmit or receives a page for downlink data transmission, the UE could then newly engage in signaling with the MN to establish an RRC connection with the MN, and the MN could newly configure dual connectivity for the UE.

Unfortunately, however, requiring the MN to receive and track reports from each of possibly multiple such SNs regarding the state of data flow on the SN's respective connection with the UE could be burdensome for the MN. Therefore, an improvement is desired.

Disclosed herein is a method and system that may help improve efficiency for the MN. In particular, the disclosure provides for having an intermediary entity effectively between the core-network gateway system and the SNs track the data flow cooperatively between the core-network gateway system and the SN(s) and provide the MN with a consolidated data-flow report. This intermediary entity could be a new core-network node through which data flows between the core-network gateway system and each of the UE's serving SNs, so that the intermediary will be aware of the state of data flow to/from the SNs for the UE. Further, the intermediary could have a signaling interface with the MN and could be configured to report to the MN over that interface.

With this arrangement, the intermediary could detect when there is and has been at least a threshold period of no data flow between the core-network gateway system and the SN(s) serving the UE—corresponding with threshold inactivity on the UE's connection(s) with the SN(s). And the intermediary could report this situation to the MN.

Once the MN thereby determines through this report that there is and has been at least a threshold period of inactivity on the UE's connection(s) with the SN(s) and the MN further determines that there is and has been at least a threshold period of inactivity on the UE's connection with the MN, the MN could then release the UE's RRC connection.

Optimally, when the UE is served by multiple SNs, the MN could thus receive a consolidated or single inactivity report from the intermediary, informing the MN of the inactivity state across the multiple SNs' connections with the UE, to facilitate RRC-connection management without the MN having to receive and process separate inactivity reports from each of the SNs.

Further, this intermediary arrangement could also provide other technical advances. For instance, even when there is no overall inactivity with respect to the UE's serving SN(s), the intermediary could report to the MN the volume of data flow between the core-network gateway and the SN(s), cooperatively for multiple SNs and/or for one or more specific SNs. And the MN could use this reported data-volume information as a basis to decide whether to release one or more SNs from the UE's dual-connectivity service and/or whether to add one or more additional SNs to the UE's dual-connectivity service.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports EN-DC service. However, it should be understood that the principles disclosed herein could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
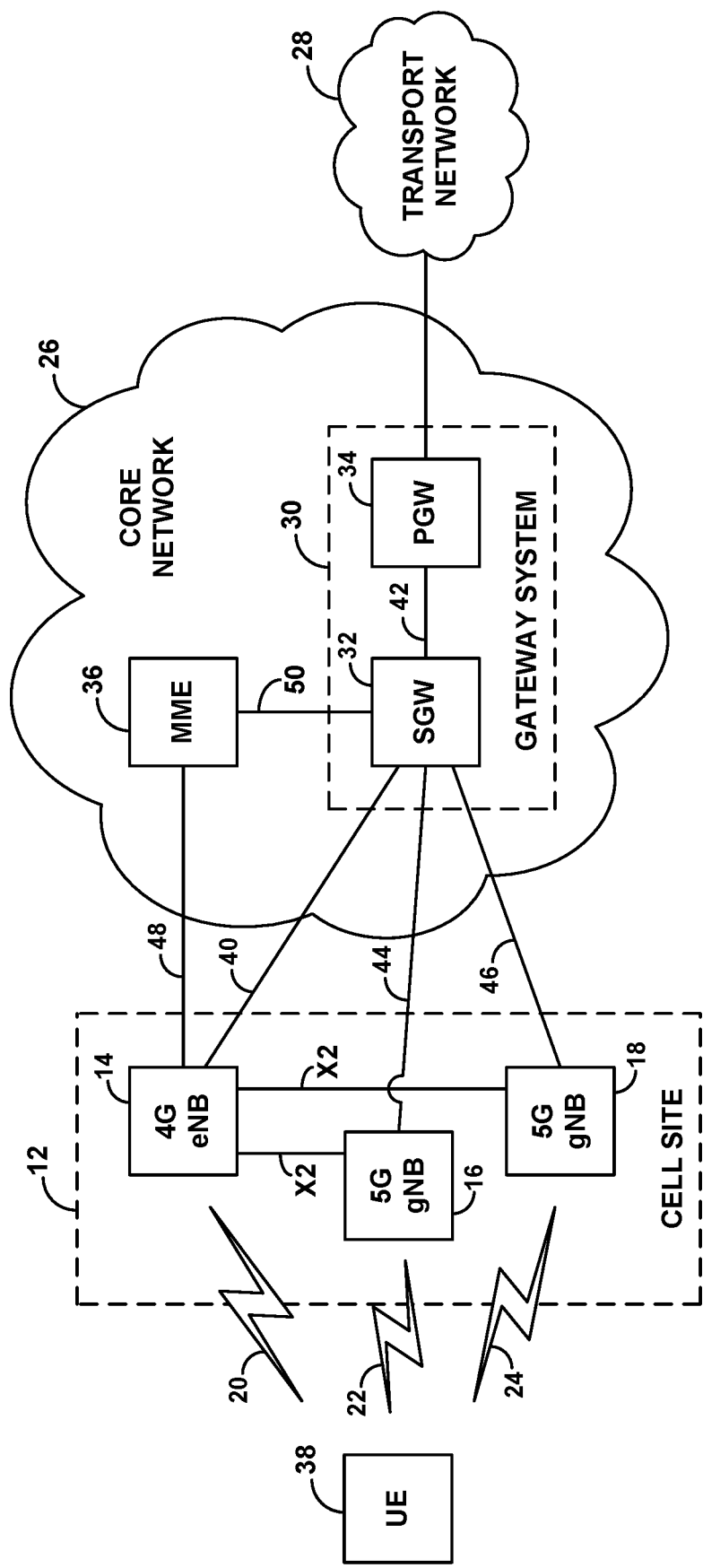
FIG. 1 is a simplified block diagram of an example network arrangement in which aspects of the present disclosure can be implemented.

FIG. 1 is a simplified block diagram of an example network arrangement that supports providing wireless-packet-data service according to 4G LTE and 5G NR, and providing EN-DC service.

The example network is shown including a representative cell site 12 including a 4G eNB 14 and two 5G gNBs 16, 18. These access nodes could be macro access nodes of the type configured to provide a wide range of coverage or could take other forms, such as a small cell access nodes, repeaters, femtocell access nodes, or the like, possibly configured to provide a smaller range of coverage. Further, the access nodes could share an antenna tower or other antenna structure as well as a baseband unit and/or other hardware, with each access node being configured to provide respective connections and service.

Each access node could be configured to provide respective coverage and service on one or more carriers. In particular, 4G eNB 14 is shown providing respective coverage 20 on which to provide 4G service, and 5G eNBs 16, 18 are shown providing respective coverage 22, 24 on which to provide 5G service.

In an example implementation, the respective coverage on each carrier could be divided over time into frames, subframes, timeslots, and symbol segments, and could be divided over frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes, such as to carry a reference signal, synchronization signals, scheduling directives, acknowledgement messages, and other control signaling.

The 4G air interface and 4G service provided by 4G eNB 14 could differ from the 5G air interface and 5G service provided by each of 5G gNBs 16, 18 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 is interfaced with a core network 26, which could be an evolved packet core (EPC) network, next generation core (NGC) network, or another network including components supporting an applicable RAT and providing connectivity with at least one transport network 28, such as the Internet. In an example implementation as shown, the core network includes a gateway system 30, having a serving gateway (SGW) 32 and a packet-data network gateway (PGW) 34, that provides user-plane connectivity with the transport network. Further, the core network includes a mobility management entity (MME) 36 that serves as a core-network controller, the MME having a signaling interface 48 with the 4G eNB 14 and a signaling interface 50 with the SGW 32.

In line with the discussion above, when a UE 38 initially enters into coverage of this network, the UE 38 could discover coverage of the 4G eNB 14, such as by scanning predefined 4G carriers to find a synchronization signal from the 4G eNB 14 and then determining that a reference signal from the 4G eNB 14 is strong enough to justify connecting. The UE 38 could then engage in random-access signaling and RRC signaling with the 4G eNB 14 to establish an RRC connection with the 4G eNB 14.

Once the UE 38 is connected with the 4G eNB 14, the UE 38 could then engage in attach signaling with the MME 36, via the UE's connection with the 4G eNB 14, to register for service with the network. And the MME 36 could responsively trigger setup for the UE 38 of at least one user-plane bearer. In particular, the MME 36 could engage in signaling with the 4G eNB 14 and SGW 32 to coordinate setup for the UE 38 of an access-bearer tunnel (e.g., S1-U tunnel) 40 between the 4G eNB 14 and the SGW 32, the SGW 32 could responsively engage in signaling with the PGW 34 to coordinate setup for the UE 38 of an associated bearer tunnel (e.g., S5 tunnel) 42 between the SGW 32 and the PGW 34, and the 4G eNB 14 could responsively engage in signaling with the UE 38 to coordinate setup for the UE 38 of an associated DRB over the air between the 4G eNB 14 and the UE 38.

Further in line with the discussion above, the 4G eNB 14 could additionally work to set up EN-DC service for the UE 38, so that the UE can then be served with packet-data service concurrently by the 4G eNB 14 and by 5G gNBs 16, 18.

For instance, the 4G eNB 14 could send to the UE 38 one or more RRC messages directing the UE 38 to scan for and report any threshold strong coverage that the UE detects on 5G carriers. And the UE 38 could responsively report to the 4G eNB 14 that the UE 38 has detected threshold strong coverage respectively from each of 5G gNB 16 and 5G gNB 18. The 4G eNB 14 could then engage in signaling with the each such 5G gNB over an X2 interface between the 4G eNB 14 and the 5G gNB, and in RRC signaling with the UE 38, to coordinate setup for the UE 38 of a connection defining a respective DRB between the UE 38 and each 5G gNB. Further, the 4G eNB 14 could engage in signaling with the MME 36, with the UE 38, and respectively with each 5G gNB, to set up for the UE 38 a split-bearer arrangement allowing the 4G eNB 14 and the 5G gNBs to concurrently provide the UE 38 with packet-data service.

Various split-bearer arrangements are possible. But one feature of a representative split-bearer arrangement is that at least some of the UE's data could flow between the core-network gateway system 30 and the 5G gNBs 16, 18 without knowledge or involvement of the 4G eNB 14.

One example of such a split-bearer arrangement is where at least one access-bearer tunnel 40 between the SGW 32 and the 4G eNB 14 gets replaced with access-bearer tunnels 44, 46 between the SGW 32 and each of the 5G gNBs, and where the 4G eNB 14 is configured to exchange some of the UE's data over an X2 interface respectively with each such 5G gNB.

To arrange for this type of split bearer, the 4G eNB 14 could transmit one or more access-bearer-modification requests to the MME 36. And the MME 36 could responsively engage in signaling to coordinate teardown of the access-bearer tunnel 40 between the SGW 32 and the 4G eNB 14 and setup for the UE 38 of an access-bearer tunnel respectively between the SGW 32 and each of the 5G gNBs. Further, the 4G eNB 14 could engage in signaling with each such 5G gNB to arrange for the 4G eNB 14 and the 5G gNB to exchange of a portion of the UE's data that the 4G eNB 14 will serve, and the 4G eNB 14 could engage in signaling with the UE 38 to arrange for the UE 38 to communicate some data with the 4G eNB 14 and other data respectively with each 5G gNB.

With this split-bearer arrangement, when the SGW 32 has data to send to the UE 38, the SGW 32 could transmit that data multiplexed over the UE's access bearers 44, 46 to the 5G gNBs 16, 18. Each 5G gNB could then work with the UE 38 to coordinate and engage in transmission of at least a portion of that data to the UE 38 over the connection between the 5G gNB. Further, either or both 5G gNBs could send another portion of that data over an X2 interface to the 4G eNB 14, and the 4G eNB 14 could work with the UE 38 to coordinate and engage in transmission of that other portion of data to the UE 38 over the connection between the 4G eNB 14 and the UE 38.

And when the UE 38 has data to send to the network, (i) the UE 38 could work with each 5G gNB to coordinate and engage in transmission of a portion of that data respectively to the 5G gNB over the connection between the UE 38 and the 5G gNB, which the 5G gNB could then forward along its respective access-bearer tunnel to the SGW 32, and (ii) the UE could work with the 4G eNB 14 to coordinate and engage in transmission of another portion of that data to the 4g eNB 14 over the connection between the UE 38 and the 4G eNB 14, the 4G eNB 14 could send that data to one or more of the UE's serving 5G gNBs, and each such 5G gNB could forward the data along its respective access-bearer tunnel to the SGW 32.

Without limitation, another example of a split-bearer arrangement where at least some of the UE's data could flow between the core-network gateway system 30 and one or more 5G gNBs without knowledge of the 4G eNB 14 is where each of the 4G eNB 14 and the 5G gNBs 16, 18 has its own respective access-bearer tunnel with the SGW 32. For instance, the existing access-bearer tunnel 40 between the SGW 32 and the 4G eNB 14 could be retained, and additional access-bearer tunnels 44, 46 could be set up between the SGW 32 and the 5G gNBs 16, 18.

To arrange for this type of split bearer, the 4G eNB 14 could transmit one or more access-bearer-modification requests to the MME 36, and the MME 36 could responsively engage in signaling with each 5G gNB and the SGW 32, to coordinate setup of a respective access-bearer tunnel between the SGW 32 system and the 5G gNB. Further, the 4G eNB 14 could engage in signaling with the UE 38 to arrange for the UE 38 to communicate some data with the 4G eNB 14 and other data respectively with each such 5G gNB.

With this arrangement, when the SGW 32 has data to send to the UE 38, the SGW 32 could send a portion of that data to the 4G eNB over the access-bearer tunnel 40 between the SGW 32 and the 4G eNB 14, and the 4G eNB 14 could engage in signaling with the UE 38 to coordinate and engage in transmission of that portion of the data to the UE 38 over the connection between the 4G eNB 14 and the UE 38. And the SGW 32 could send one or more other portions of the data respectively the 5G gNBs 16, 18 over the access-bearer tunnels 44, 46 between the SGW 32 and the 5G gNBs 16, 18, and each such 5G gNB could work with the UE 38 to coordinate and engage in transmission of the data to the UE 38 over the respective connection between the 5G gNB and the UE.

And when the UE 38 has data to send to the network, (i) the UE 38 could work with each 5G gNB to coordinate and engage in transmission of a portion of that data to the 5G gNB over the respective connection between the UE 38 and the 5G gNB, and the 5G gNB could forward that portion of the data to the SGW 32 over the respective access-bearer tunnel between the 5G gNB and the SGW 32, and (ii) the UE 38 could work with the 4G eNB 14 to coordinate and engage in transmission of another portion of that data to the 4G eNB 14 over the connection between the UE 38 and the 4G eNB 14, and the 4G eNB 14 could forward that portion of the data to the SGW 32 over the access-bearer tunnel 40 between the 4G eNB 14 and the SGW 32.

As noted above, with this arrangement, the 4G eNB 14 could be responsible for managing the UE's RRC connection state, based on a consideration of the overall data flow to/from the UE 38.

In particular, the 4G eNB 14 could determine when there is and has been at least a threshold period of inactivity on (i) the connection between the 4G eNB 14 and the UE 38, (ii) the connection between the 5G gNB 16 and the UE 38, and (iii) the connection between the 5G gNB 18 and the UE. And when the 4G eNB 14 determines that there is and has been such inactivity, the 4G eNB 14 could transition the UE to RRC-idle mode. Namely, as noted above, the 4G eNB 14 could first engage in signaling to transition the UE back from dual connectivity to standalone connectivity with the 4G eNB 14, and the 4G eNB 14 could then engage in signaling to tear down the UE's RRC connection, transitioning the UE 38 from RRC-connected mode to RRC-idle mode.

But as further indicated above, at issue in this process is how the 4G eNB 14 will learn about the extent of data communication between the UE 38 and the 5G gNBs 16, 18, given that at least some of that data communication may occur without knowledge or involvement of the 4G eNB 14.

Figure 2:
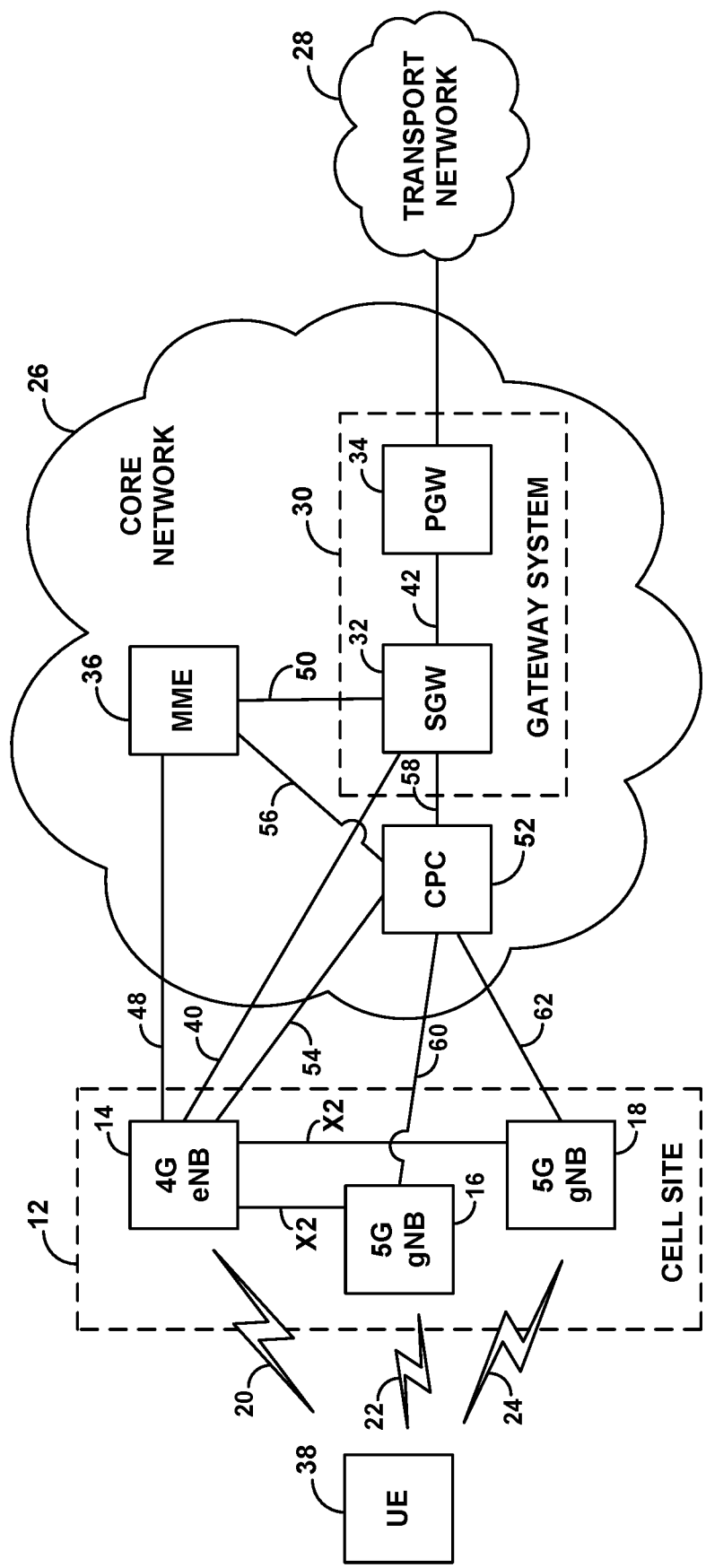
FIG. 2 is a variation on the arrangement of FIG. 1, showing introduction of an intermediary node disposed in a communication path between a gateway system and a UE's serving secondary nodes.

FIG. 2 is a simplified block diagram of an example network arrangement as a modification of the arrangement of FIG. 1, showing the inclusion and use of an intermediary, centralized packet controller (CPC) 52, to help make this processing by the 4G eNB 14 more efficient.

As shown, the CPC 52 could be provided as a node in the core-network 26 that sits functionally between the SGW 32 and the 5G gNBs 16, 18, so that user-plane data passing between the SGW 32 and the 5G gNBs 16, 18 would flow through the CPC 52, and the CPC 52 could thereby be aware of that data flow or the absence thereof. Further, the CPC 52 and the 4G eNB 14 could be configured with a signaling interface 54, through which the CPC 52 and the 4G eNB 14 could engage in signaling communication with each other, so that the CPC 52 could provide the 4G eNB 14 with a consolidated report when there is and has been absence of data flow between the SGW 32 and the multiple 5G gNBs 16, 18 for at least a threshold inactivity period.

Conveniently with this arrangement, the 4G eNB 14 could thus receive and make use of this type of consolidated report from the CPC 52 to facilitate managing the UE's RRC connection, without a need for the 4G eNB to receive and track separate reports respectively from each of the UE's serving 5G gNBs 16, 18. Namely, once the 4G eNB 14 learns from the CPC 52 that there is and has been at least a threshold period of no data flowing to/from the UE's serving 5G gNBs, and the 4G eNB 14 has determined that there also is and has been at least a threshold period of inactivity on the connection between the 4G eNB 14 and the UE, 38 the 4G eNB could then transition the UE to RRC-idle mode as discussed above.

To configure this arrangement in practice, the CPC 52 could be deployed as a node in the core network, and signaling interfaces could be manually or automatically configured between the CPC 52 and the 4G eNB 14 and between the CPC 52 and the MME 36. Namely, signaling interface 54 could be configured between the CPC 52 and the 4G eNB 14, to facilitate signaling communication between the CPC 52 and the 4G eNB 14. And a signaling interface 56 could be configured between the CPC 52 and the MME 36 to facilitate signaling communication between the CPC 52 and the MME 36.

When the 5G gNBs 16, 18 are added to provide secondary connectivity for the UE 38, interfaces could then be established to allow CPC 52 to function as an intermediary between the SGW 32 and the 5G gNBs 16, 18 with respect to user-plane communications to and from the UE 38.

In an example implementation for instance, when the 4G eNB 14 sends one or more access-bearer modification requests to the MME 36 for adding the 5G gNBs as SNs for the UE 38, the MME 36 could responsively engage in signaling with the CPC 52 and with the SGW 32 to set up for the UE 38 a user-plane tunnel 58 between the CPC 52 and the SGW 32. Further, as to each 5G gNB, when the 4G eNB 14 engages in signaling with the MME 36 and with the 5G gNB to set up a split bearer, the MME 36 could notify the CPC 52 and the SGW 32 that the 5G gNB is being added as an SN for the UE 38, and the 5G gNB and CPC 52 could responsively engage in signaling with each other to set up for the UE 38 a respective user-plane tunnel between the 5G gNB and the CPC 52.

Thus, a user-plane tunnel 58 would be configured for the UE between the CPC 52 and the SGW 32, a user-plane tunnel 60 would be configured for the UE 38 between 5G gNB 16 and the CPC 52, and a user-plane tunnel 62 would be configured for the UE 38 between 5G gNB 18 and the CPC 52.

With this arrangement, when the SGW 32 has data to send to the UE 38, that data would flow over interface 58 to the CPC 52 and could be multiplexed for transmission in turn from the CPC 52 over interfaces 60, 62 to the 5G gNBs 16, 18. And as noted above, the 5G gNBs 16, 18 could each transmit a portion of to the UE 38 over their respective connections with the UE 38, and either or both 5G gNB could send another portion of the data to the 4G eNB 14, which the 4G eNB 14 could transmit to the UE over its connection with the UE 38.

Likewise, when the UE 38 has data to send, (i) the UE could transmit some of the data respectively to each of the 5G gNBs over the UE's connections with the 5G gNBs, and (ii) the UE could transmit other of the data to the 4G eNB over the UE's connection with the 4G eNB, and the 4G eNB 14 could send that data to one or more of the 5G gNBs. The 5G gNBs could then forward that data over interfaces 60, 62 to the CPC 52, and the CPC 52 could forward the data in turn over interface 58 to the SGW.

In operation, CPC 52 could monitor for the occurrence of any such user-plane data flow between the SGW and the 5G gNBs, for the UE 38. If and when the CPC 52 thereby detects that there is and has been at least a threshold period of no such data flow, the CPC 52 could responsively transmit over interface 54 to the 4G eNB 14 an inactivity report.

As this inactivity report represents the absence of user-plane data flow between the CPC 52 and the 5G gNBs, it establishes that there is and has been no data flow over the UE's connections with the 5G gNBs. Conveniently, the 4G eNB 14 could thus use this report from the CPC 52 as a basis to manage the UE's RRC connection. Namely, as noted above, once the 4G eNB 14 determines from this report that there is and has been at least a threshold period of inactivity on the UE's connections with the 5G gNBs and the 4G eNB 14 also determines that there is and has been at least a threshold period of inactivity on its own connection with the UE 38, the 4G eNB 14 can then responsively release the UE's RRC connection.

In addition, as discussed above, this configuration could provide other technical advances as well. For instance, even if there is not threshold inactivity on the UE's connections with the 5G gNBs 16, 18, the CPC 52 might also provide the 4G eNB with reports regarding the extent of data flowing to/from the UE 38, which the 4G eNB might use as a basis to control whether to remove one or more 5G gNBs from serving the UE 38 and/or to add one or more other 5G gNBs to serve the UE.

By way of example, the CPC 52 could monitor the flow of data between SGW 32 and CPC 52 for the UE 38, and the CPC 52 could determine if the rate of data flow is at least as high as a predefined high threshold or at least as low as a predefined low threshold. If the CPC 52 thereby detects that the rate of data flow is at least as high as a predefined high threshold, then the CPC 52 could then report that fact to the 4G eNB 14, and the 4G eNB 14 could responsively add another 5G gNB to provide additional secondary connectivity for the UE 38, so as to help support the UE's data flow. Whereas, if the CPC 52 thereby detects that the rate of data flow is at least as low as a predefined low threshold, then the CPC 52 could then report that fact to the 4G eNB 14, and the 4G eNB 14 could responsively remove at least one of the 5G gNBs from the UE's service, to better align with the UE's lower data flow.

Alternatively, the CPC 52 could regularly report to the 4G eNB 14 the data flow for the UE between the SGW 32 and the CPC 52, and the 4G eNB 14 could itself determine whether the reported data flow meets one or more thresholds so that the 4G eNB 14 could responsively take action accordingly.

Note also that, in an alternative implementation, the CPC 52 could be provided as a function within the SGW 32 or within one or more of the 5G gNBs and could still be configured to operate as an intermediary as discussed above.

Figure 3:
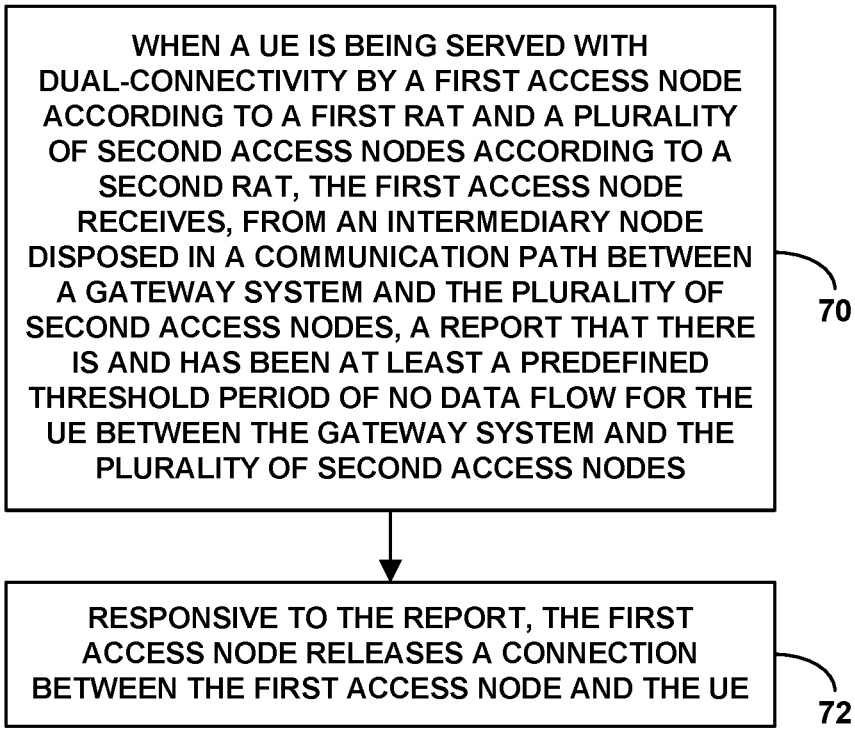
FIG. 3 is a flow chart depicting an example method in accordance with the disclosure.

FIG. 3 is a flow chart depicting a method that can be carried out in accordance with the present disclosure, to control connectivity of a UE.

As shown in FIG. 3, at block 70, the method includes, when the UE is being served with dual connectivity by the first access node according to a first RAT and a plurality of second access nodes according to a second RAT, the first access node receiving, from an intermediary node disposed in a communication path between a gateway system and the plurality of second access nodes, a report that there is and has been at least a predefined threshold period of no data flow for the UE between the gateway system and the plurality of second access nodes. And at block 72, the method includes, responsive to the report, the first access node releasing a connection between the first access node and the UE.

In line with the discussion above, the method can additionally include, responsive to the report, (i) transitioning the UE from being served with dual connectivity by the first access node and by the plurality of access nodes to being served instead with standalone connectivity by the first access node, and then (ii) releasing the connection between the first access node and the UE. For instance, the first access node could engage in signaling to reverse the dual-connectivity setup so that the UE is then served by just the first access node, and the first access node could then engage in signaling with the UE to release the UE's connection with the first access node.

As further discussed above, the connection at issue here could be an RRC connection, and the act of releasing the connection between the first access node and the UE could involve transitioning the UE from an RRC-connected mode to an RRC-idle mode. Further, as discussed above, the first RAT could be 4G LTE, the second RAT could be 5G NR, and the dual connectivity could be EN-DC, among other possibilities.

Figure 4:
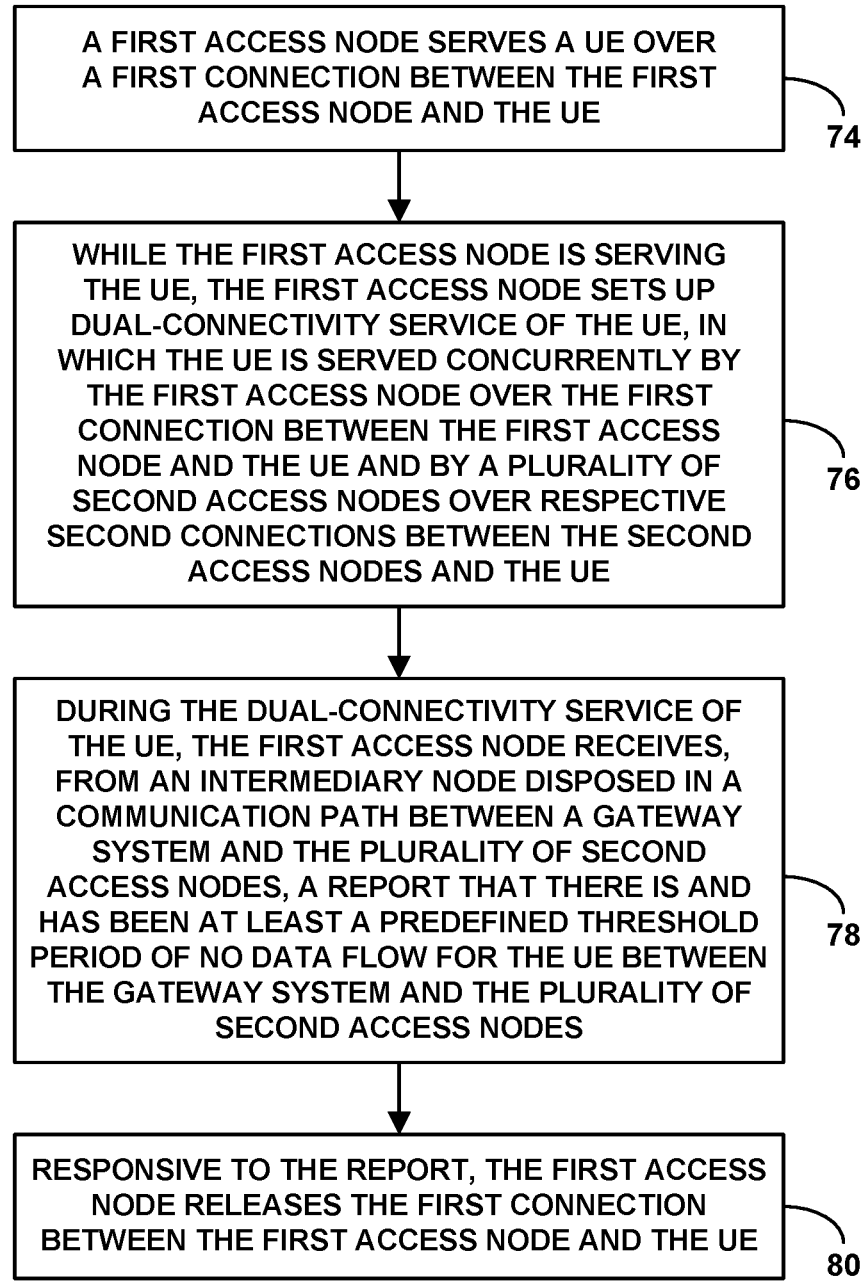
FIG. 4 is another flow chart depicting an example method in accordance with the disclosure.

FIG. 4 is next another flow chart depicting a method that could be carried out in accordance with the present disclosure, to control connectivity of UE.

As shown in FIG. 4, at block 74 the method includes a first access node serving the UE over a first connection between the first access node and the UE. Further, at block 76, the method includes, while the first access node is serving the UE, the first access node setting up dual-connectivity service of the UE, in which the UE is served concurrently by the first access node over the first connection between the first access node and the UE and by a plurality of second access nodes over respective second connections between the second access nodes and the UE.

Still further, at block 78, the method includes, during the dual-connectivity service of the UE, the first access node receiving, from an intermediary node disposed in a communication path between a gateway system and the plurality of second access nodes, a report that there is and has been at least a predefined threshold period of no data flow for the UE between the gateway system and the plurality of second access nodes. And at block 80, the method includes, responsive to the report, the first access node releasing the first connection between the first access node and the UE.

In line with the discussion above, in this method, the act of setting up the dual-connectivity service of the UE could involve the first access node engaging in signaling with at least the second access nodes and a core-network controller to set up the second connections and to set up a split-bearer arrangement for the UE. And as discussed above, the split-bearer arrangement could include (i) a first bearer tunnel between the gateway system and the intermediary node and (ii) respective second bearer tunnels between the intermediary and the second access nodes, so that data flowing between the gateway system and the second access nodes for the UE would flow over the first bearer tunnel, through the intermediary node, and over the respective second bearer tunnels.

As further discussed above, the method could additionally include, during the dual-connectivity service of the UE, the first access node receiving, from the intermediary, a further report indicating that a rate of data flow cooperatively for the UE between the gateway system and the second access nodes is at least as high as a predefined threshold. And the method could then include, responsive to the further report, the first access node initiating addition of at least one additional second access node to the dual-connectivity service of the UE—such as by engaging in the process as described to add an additional second access node to the UE's dual-connectivity service.

Likewise, as discussed above, the method could additionally include, during the dual-connectivity service of the UE, the first access node receiving, from the intermediary, a further report indicating that a rate of data flow cooperatively for the UE between the gateway system and the second access nodes is at least as low as a predefined threshold, although not zero. And the method could then include, responsive to the further report, initiating by the first access node removal of at least one of the second access nodes from the dual-connectivity service of the UE—such as by engaging in signaling to reverse the addition of each such second access node.

Various features discussed above can be implemented in this context as well, and vice versa. Without limitation, for instance, the connection at issue between the first access node and the UE could include an RRC connection, and the act of releasing the connection could involve transitioning the UE from an RRC-connected mode to an RRC-idle mode.

Figure 5:
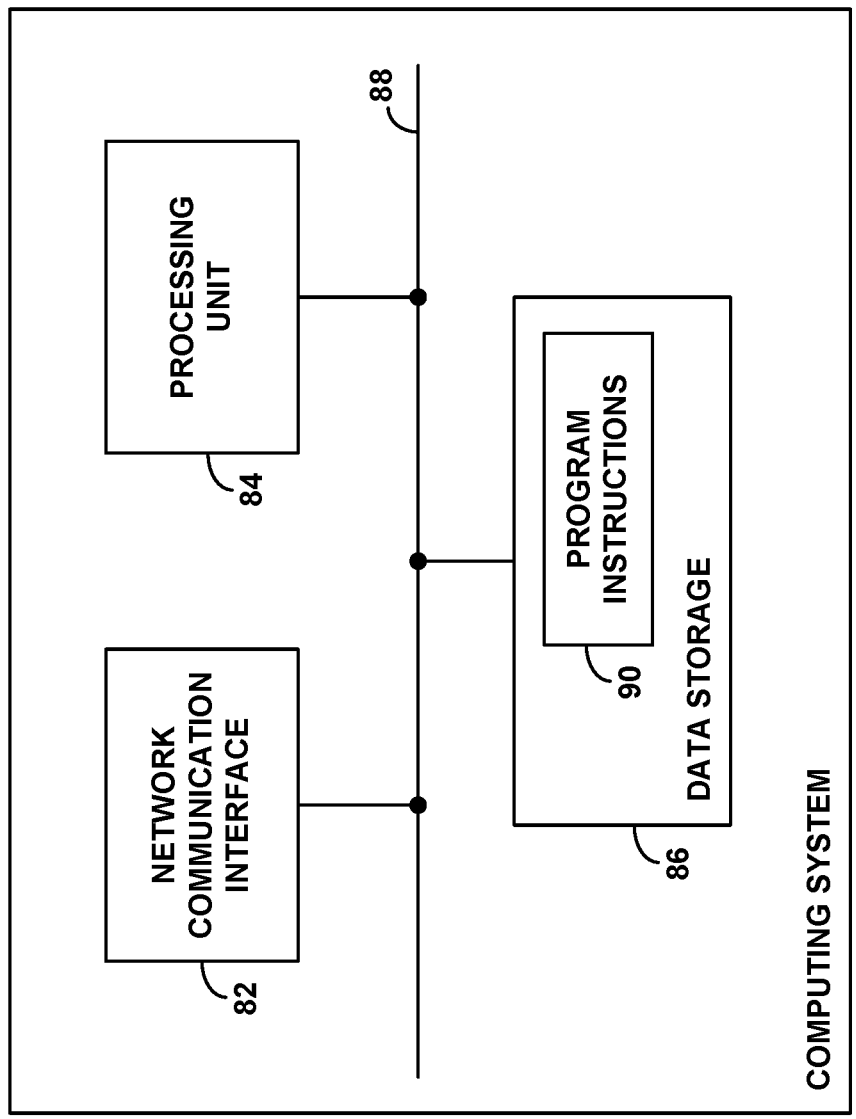
FIG. 5 is a simplified block diagram of an example computing system operable in accordance with the disclosure.

FIG. 5 is a simplified block diagram of a computing system, which could represent the intermediary node in the methods described above, such as CPC 52 shown in FIG. 2 for instance.

As shown in FIG. 5, the computing system includes a network communication interface 82, a processing unit 84, and non-transitory data storage 86, which could be integrated together or interconnected by a system but, network, or other connection mechanism 88, among other possibilities.

Network communication interface 82 could include one or more wired and/or wireless network communication modules, such as Ethernet connection modules for instance. Processing unit 84 could include one or more general purpose processors (e.g., microprocessors) and/or one or more dedicated processors (e.g., application specific integrated circuits). And non-transitory data storage 86 could include one or more volatile and/or non-volatile storage components, such as magnetic, optical, or flash storage for instance.

As further shown, data storage 86 could hold program instructions 90, which could be executable by processing unit 84 to carry out various operations described herein.

For example, when a UE is being served with dual connectivity by a first access node and a plurality of second access nodes, with the first access node being a master node for the dual connectivity, the instructions could be executable to cause the processing unit to report over a signaling interface to the first access node when there is and has been at least a predefined period of no data flow for the UE between a gateway system and the plurality of second access nodes. Further, the when the UE is being served with the dual connectivity, the instructions could be executable to cause the processing unit to report to the first access node a non-zero level of data flow for the UE between the gateway system and the second access nodes. Other examples are possible as well.

Figure 6:
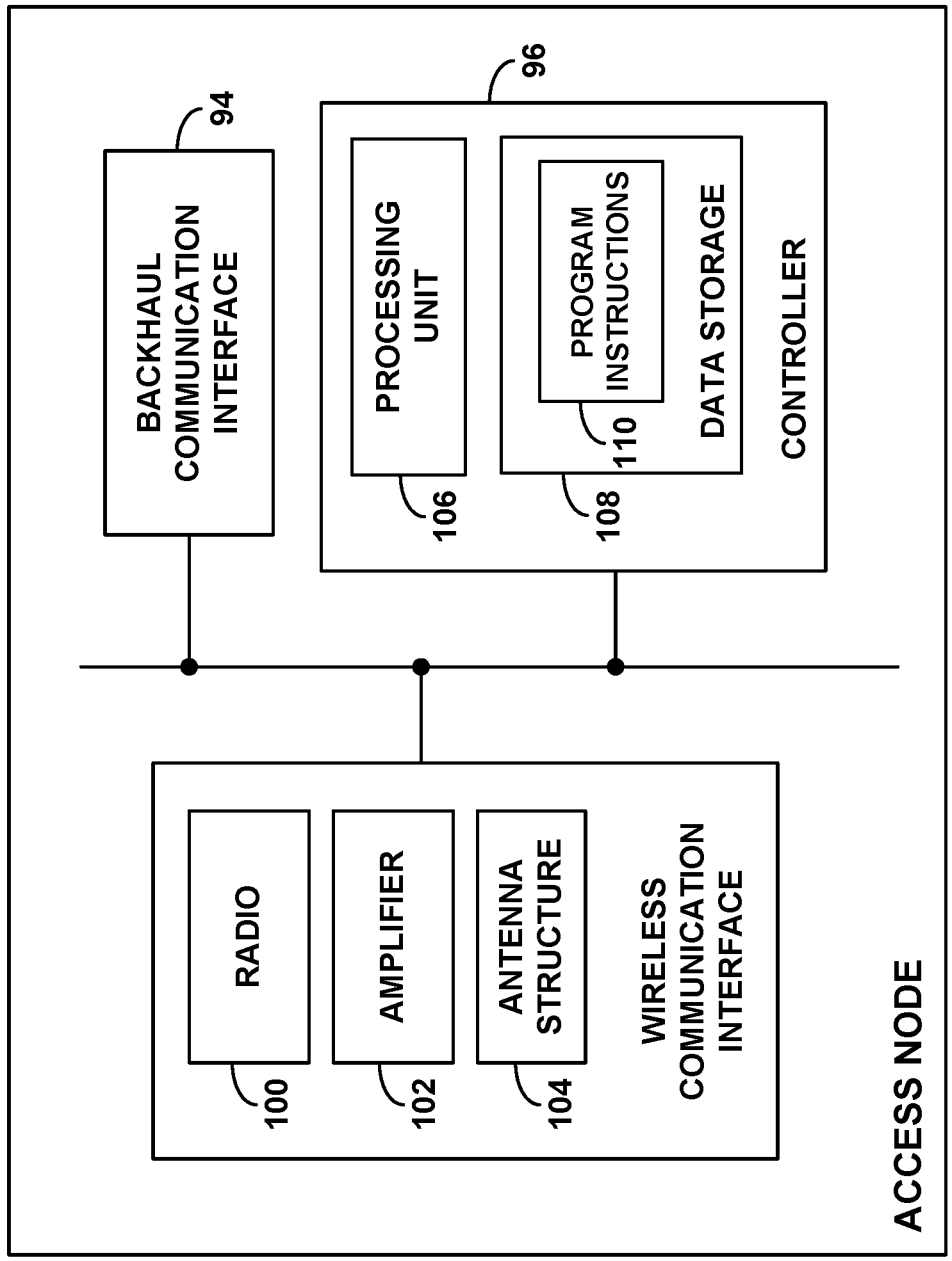
FIG. 6 is a simplified block diagram of an example first access node operable in accordance with the disclosure.

FIG. 6 is next a simplified block diagram of an example access node, which could represent the first access node in the methods described above, such as 4G eNB 14 shown in FIGS. 1 and 2 for instance.

As shown in FIG. 6, the example access node includes a wireless communication interface 92 a backhaul communication interface 94, and a controller 96, which could be integrated together and/or communicatively linked by a network, system bus, or other connection mechanism 98.

As shown, wireless communication interface 92 could include a radio 100, a power amplifier 102, and antenna structure 104. The radio 100 could operate to interface between encoded baseband signals and RF signals. The power amplifier 102 could operate to amplify signals for transmission by the antenna structure 104. And the antenna structure 104 could comprise a plurality of antennas for communicating over the air interface, where the air interface defines physical channel resources for carrying data wirelessly between the base station to a plurality of UEs served by the base station.

Backhaul communication interface 94 could be a network communication interface (e.g., an Ethernet network interface port and/or connection) through which the base station can communicate with various other network entities.

And controller 96, which could comprise a processing unit 106 (e.g., one or more general purpose microprocessors and/or one or more dedicated processors), non-transitory data storage (e.g., one or more volatile and/or non-volatile storage components) 108, and program instructions 110 stored in the data storage and executable by the processing unit, or could take other forms, could be operable to cause the access node to carry out various operations as described herein.

For example, when a UE is being served with dual connectivity by the access node as master access node and by a plurality of second access nodes, the controller could operate to respond to the above-discussed intermediary report that there is and has been at least a threshold period of data flow for the UE between the gateway system and the second access nodes, by releasing a connection between the first access node and the UE. Further, the controller could operate to respond to the above-discussed intermediary report of a non-zero level of data flow for the UE between the gateway system and the second access nodes, by changing a quantity of second access nodes serving the UE in the dual connectivity.

Here too, various features described above could be applied in this context as well, and vice versa.

Exemplary embodiments have been described above. Those skilled in the art will understand, however, that changes and modifications may be made to these embodiments without departing from the true scope and spirit of the invention.

We claim:

1. A method of controlling connectivity of a user equipment device (UE), the method comprising:
   when the UE is being served with dual connectivity by a first access node according to a first radio access technology (RAT) and a plurality of second access nodes according to a second RAT, receiving by the first access node, from an intermediary node disposed in a communication path between a gateway system and the plurality of second access nodes, a report that there is and has been at least a predefined threshold period of no data flow for the UE between the gateway system and the plurality of second access nodes; and
   responsive to the report, transitioning the UE from being served with dual connectivity by the first access node and by the plurality of access nodes to being served instead with standalone connectivity by the first access node, and then releasing by the first access node a connection between the first access node and the UE.

2. The method of claim 1, wherein the connection between the first access node and the UE comprises a Radio Resource Control (RRC) connection.

3. The method of claim 2, wherein releasing the connection between the first access node and the UE comprises transitioning the UE from an RRC-connected mode to an RRC-idle mode.

4. The method of claim 1, wherein the first RAT is 4G LTE, wherein the second RAT is 5G NR, and wherein the dual connectivity is EUTRA-NR Dual Connectivity (EN-DC).

5. A method of controlling connectivity of a user equipment device (UE), the method comprising:
- serving, by a first access node, the UE over a first connection between the first access node and the UE;
- while serving the UE, setting up by the first access node dual-connectivity service of the UE, wherein, in the dual-connectivity service, the UE is served concurrently by the first access node over the first connection between the first access node and the UE and by a plurality of second access nodes over respective second connections between the second access nodes and the UE;
- during the dual-connectivity service of the UE, receiving by the first access node, from an intermediary node disposed in a communication path between a gateway system and the plurality of second access nodes, a report that there is and has been at least a predefined threshold period of no data flow for the UE between the gateway system and the plurality of second access nodes; and
- responsive to the report, transitioning the UE from being served with dual connectivity by the first access node and by the plurality of access nodes to being served instead with standalone connectivity by the first access node, and then releasing by the first access node the first connection between the first access node and the UE.

6. The method of claim 5, wherein setting up the dual-connectivity service of the UE comprises engaging in signaling with at least the second access nodes and a core-network controller, to set up the second connections and to set up a split-bearer arrangement for the UE.

7. The method of claim 6, wherein the split-bearer arrangement includes (i) a first bearer tunnel between the gateway system and the intermediary node and (ii) respective second bearer tunnels between the intermediary and the second access nodes, wherein data flowing between the gateway system and the second access nodes for the UE flows over the first bearer tunnel, through the intermediary node, and over the respective second bearer tunnels.

8. The method of claim 5, further comprising:
- during the dual-connectivity service of the UE, receiving by the first access node, from the intermediary, a further report indicating that a rate of data flow cooperatively for the UE between the gateway system and the second access nodes is at least as high as a predefined threshold; and
- responsive to the further report, initiating by the first access node addition of at least one additional second access node to the dual-connectivity service of the UE.

9. The method of claim 5, further comprising:
- during the dual-connectivity service of the UE, receiving by the first access node, from the intermediary, a further report indicating that a rate of data flow cooperatively for the UE between the gateway system and the second access nodes is at least as low as a predefined threshold, although not zero; and
- responsive to the further report, initiating by the first access node removal of at least one of the second access nodes from the dual-connectivity service of the UE.

10. The method of claim 5, wherein the first connection between the first access node and the UE comprises a Radio Resource Control (RRC) connection.

11. The method of claim 10, wherein releasing the connection between the first access node and the UE comprises transitioning the UE from an RRC-connected mode to an RRC-idle mode.

12. The method of claim 5, wherein the first access node serves the UE over the first connection according to a first radio access technology (RAT) and wherein the second access nodes serve the UE over the second connections according to a second RAT.

13. The method of claim 12, wherein the first RAT is 4G LTE, wherein the second RAT is 5G NR, and wherein the dual-connectivity service is EUTRA-NR Dual Connectivity (EN-DC).

14. A system for controlling connectivity of a user communication device (UE), the system including:
- a plurality of access nodes, including a first access node configured to provide service according to a first radio access technology (RAT) and a plurality of second access nodes each configured to provide service according to a second RAT; and
- an intermediary node disposed in a user-plane communication path between a core-network gateway system and the plurality of second access nodes and having a signaling interface with the first access node,
- wherein when the UE is being served with dual connectivity by the first access node and the plurality of second access nodes, with the first access node being a master node for the dual connectivity, (i) the intermediary is configured to report over the signaling interface to the first access node when there is and has been at least a predefined period of no data flow for the UE between the gateway system and the plurality of second access nodes, and (ii) the first access node is configured to respond to the report by transitioning the UE from being served with the dual connectivity to being served instead with standalone connectivity by the first access node, and then releasing a connection between the first access node and the UE.

15. The system of claim 14, wherein the connection between the first access node and the UE comprises a Radio Resource Control (RRC) connection.

16. The system of claim 15, wherein releasing the connection between the first access node and the UE comprises transitioning the UE from an RRC-connected mode to an RRC-idle mode.

17. The system of claim 15, wherein the first RAT is 4G LTE, wherein the second RAT is 5G NR, and wherein the dual connectivity is EUTRA-NR Dual Connectivity (EN-DC).

18. The system of claim 14,
- wherein, when the UE is served with the dual connectivity, the intermediary node is further configured to report to the first access node a non-zero level of data flow for the UE between the gateway system and the second access nodes, and the first access node is further configured to respond to the reported level of data flow by changing a quantity of the second access nodes serving the UE in the dual connectivity.

* * * * *